United States Patent [19]

Komatsu

[11] Patent Number: 4,952,161
[45] Date of Patent: Aug. 28, 1990

[54] CARD CONNECTOR

[75] Inventor: Yasuhiro Komatsu, Osaka, Japan

[73] Assignee: Hosiden Electronics Co., Ltd., Yao, Japan

[21] Appl. No.: 302,329

[22] Filed: Jan. 27, 1989

[30] Foreign Application Priority Data

Mar. 3, 1988 [JP] Japan .............................. 63-28842[U]

[51] Int. Cl.⁵ ............................................ H01R 13/62
[52] U.S. Cl. .................................. 439/155; 439/325; 439/329; 439/159
[58] Field of Search ................ 439/152, 153, 157, 159, 439/160, 180, 330, 266, 298, 372, 484, 476, 267, 260, 328, 325, 155, 329

[56] References Cited

U.S. PATENT DOCUMENTS 4,128,288 12/1978 Zachry et al. ...................... 439/152
4,466,680 8/1984 Sakai ................................... 439/159
4,734,049 3/1988 George et al. ....................... 439/157
4,778,401 10/1988 Boudreau et al. ................... 439/157

FOREIGN PATENT DOCUMENTS 2512193 10/1976 Fed. Rep. of Germany ...... 439/152

Primary Examiner—David L. Pirlot
Attorney, Agent, or Firm—Jones, Tullar & Cooper

[57] ABSTRACT

A card connector to be used for memory cards having a connector body and a plate-like frame attached to a frame member having a card insertion and removal opening(s), and a slider(s) operable in association with the card insertion/removal operation attached to the frame in an overlapping manner. The card connector is made thin with high mechanical strength assured. In particular, a plurality of cards may be overlappingly mounted on the card connector. Both release of the cards, held at setting positions and card unloading, are carried out by a single operation of actuators.

3 Claims, 5 Drawing Sheets

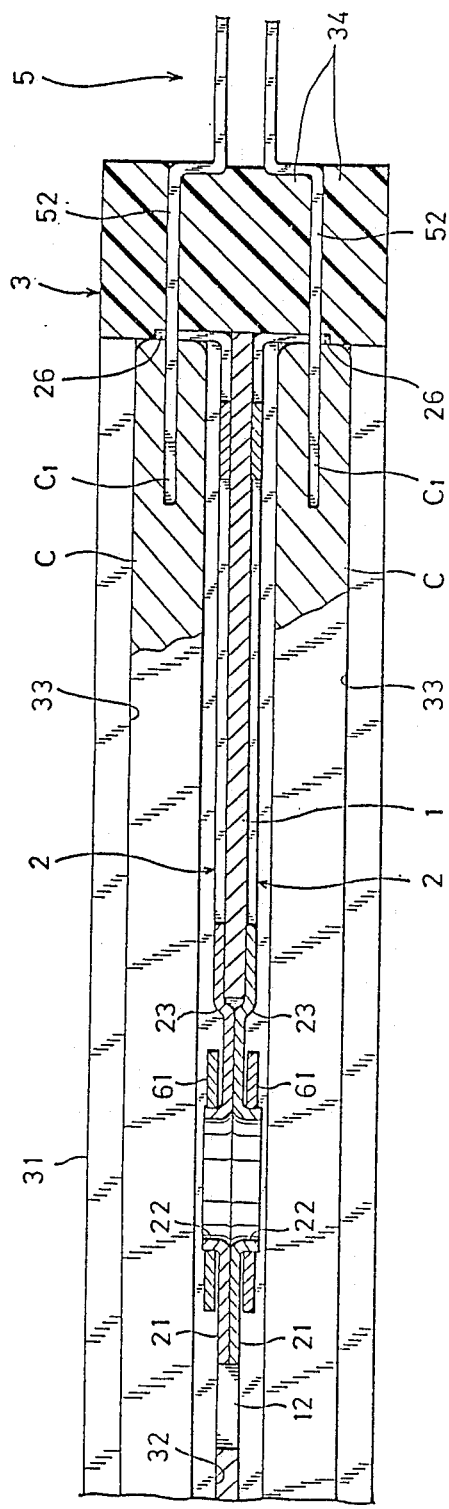
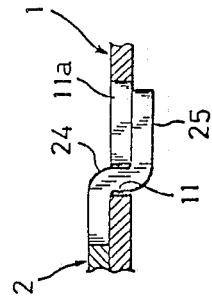
FIG. 4
FIG. 5

CARD CONNECTOR

BACKGROUND OF THE INVENTION

1. Field of the Invention

The present invention relates to a card connector, and more particularly to a card connector to be used for electrically connecting the external terminals of a memory card incorporating a memory mechanism such as ICs, to the external contacts of a computer or the like.

2. Description of the Prior Art

In this age, computers using memory cards and devices relevant thereto are apt to be made in a more comptact design. This provokes a demand for card connectors as thin as a few mm. Such a trend is also applied to a card connector on which a plurality of, for example two, memory cards may be overlappingly mounted.

There is known a card connector in which a plurality of memory cards are adapted to be used in an overlapping manner in the vicinity with one another. In such a card connector, to improve the maneuverability of card removal, it is required to dispose ejection mechanisms for removing the memory cards mounted on the connector.

In a conventional connector, there is no other way than that the ejection mechanisms are incorporated, as independent parts, in a device on which the connector is mounted.

There is also known a card connector having a body which houses, in a longitudinally movable manner, a slider having an engagement portion. When a memory card is inserted into the body, the slider is pushed to the retreat position with the front edge of the card engaged with the engagement portion. Thus, the card is held at the setting position. In such a card connector, there are individually disposed a lock mechanism for holding the card at the setting position and a mechanism for unloading the card from the body after the lock state has been released.

In such a connector having therein a space in which the ejection mechanism is to be housed, the thickness of the connector is accordingly increased. Therefore, the reduction in thickness of the connector is disadvantageously limited due to the presence of such a space. Further, the conventional connector presents the problem that both requirements of a sufficient mechanical strength and a thin structure are not met at the same time.

Further, for unloading the card held at the setting position, the conventional connector requires two different operations, i.e., an operation for releasing the card lock state and an operation for unloading the card. This presents a poor maneuverability.

SUMMARY OF THE INVENTION

It is an object of the present invention to provide a card connector in which a frame for assuring a mechanical strength required for the card connector constitutes a part of an ejection mechanism, enabling the card connector to be readily made thinner than a conventional card connector, yet with a sufficient mechanical strength maintained.

It is another object of the present invention to provide a card connector which may be made thin in comparison with the number of memory cards which can be mounted in high density in an overlapping manner.

It is a further object of the present invention to provide a card connector in which release of a card held at a setting position and card unloading are carried out with a single operation, thus improving maneuverability.

To achieve the first object above-mentioned, the card connector in accordance with a first embodiment of the present invention comprises:

a metallic plate-like frame;

a frame member provided at the front end thereof with a card insertion and removal opening;

a connector body disposed at the rear end of the frame member;

a slider longitudinally slidably attached to the frame;

a spring for biasing the slider normally in the advancing direction thereof;

a shaft swingingly attached to the frame; and an actuator.

The connector in accordance with the first embodiment of the present invention is characterized in that:

the frame is fitted in the frame member;

the frame member has card guide grooves;

the slider has at least one engagement pawl adapted to be opposite to the tip of a card when the card is inserted into the guide grooves; and the shaft has one end swingingly connected to the slider and the other end opposite to the actuator.

To achieve the second object above-mentioned, the connector in accordance with a second embodiment of the present invention is characterized in that, in the first embodiment, the slider is attached to the frame at each of the upper and lower sides thereof, and two shafts and two actuators are disposed, one end of each shaft being swingingly connected to each slider and the other end of each shaft being opposite to each actuator.

To achieve the third object above-mentioned, a third embodiment of the present invention provides a card connector the body of which houses, in a longitudinally movable manner, a slider having at least one engagement pawl and in which, when a card is inserted into the body, the slider is pushed to the retreat position with the tip of the card engaged with the engagement pawl of the slider, such that the card is held at the setting position.

The card connector of the third embodiment comprises:

a shaft swingingly attached to the connector body and having one end swingingly connected to the slider and the other end connected to a longitudinally movable actuator projecting from the front end of the connector body;

a swing member disposed on the connector body and provided at one end thereof with an engagement portion adapted to be engaged with and disengaged from a portion to be engaged of a card held at the setting position above-mentioned;

a cam surface formed at the tip of the actuator, along which the other end of the swing member is adapted to follow; and a play adapted to be formed between the actuator and the other end of the shaft, whereby, when the actuator is pushed, the other end of the swing member is adapted to be displaced by the cam surface such that the engagement portion of the swing member is disengaged from the portion to be engaged of the card, while the play disappears such that the shaft is interlocked with the actuator.

According to each of the card connectors in accordance with the first and second embodiments of the present invention, the metallic plate-like frame assures the mechanical strength required for the connector. The frame for assuring the mechanical strength of the connector is a flat plate, and constitutes an ejection mechanism together with the sliders, the shafts, the actuators, the springs and the like. Thus, the ejection mechanism is not required as an independent component part. This eliminates a space in which the ejection mechanism is incorporated as one independent part.

Accordingly, the connector of the present invention may be readily made thin without prejudice to the mechanical strength required for the connector. Thus, the connector of the present invention may be fully accommodated to the recent demand for smaller-size computers and the like.

The second embodiment of the present invention may provide a thin card connector in or from which two memory cards may be individually inserted and removed.

According to the card connector in accordance with the third embodiment of the present invention, by a single pushing operation of the actuator, the card may be first released from the locked state by the swing member and then unloaded following the advancement of the slider. This improves the maneuverability as compared with a conventional connector in which such release and unloading are individually carried out by two different operations.

BRIEF DESCRIPTION OF THE DRAWINGS

FIG. 4 is an enlarged section view taken along the line IV—IV in FIG. 2;

FIG. 5 is an enlarged section view taken along the line V—V in FIG. 2;

DETAILED DESCRIPTION OF THE PREFERRED EMBODIMENTS

Figure 1:
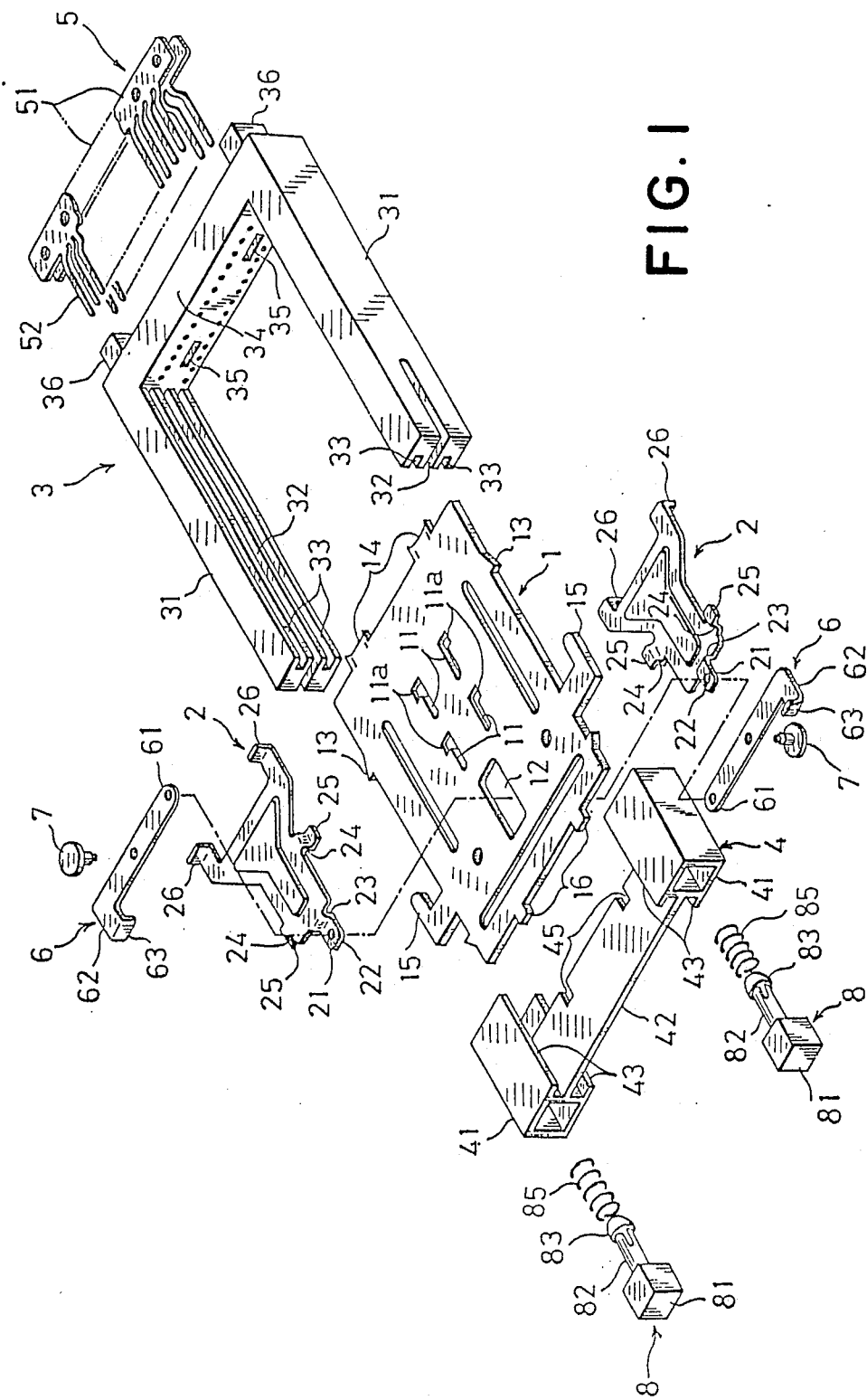
FIG. 1 is an exploded perspective view of each of the card connectors in accordance with the first and second embodiments of the present invention.
Figure 2:
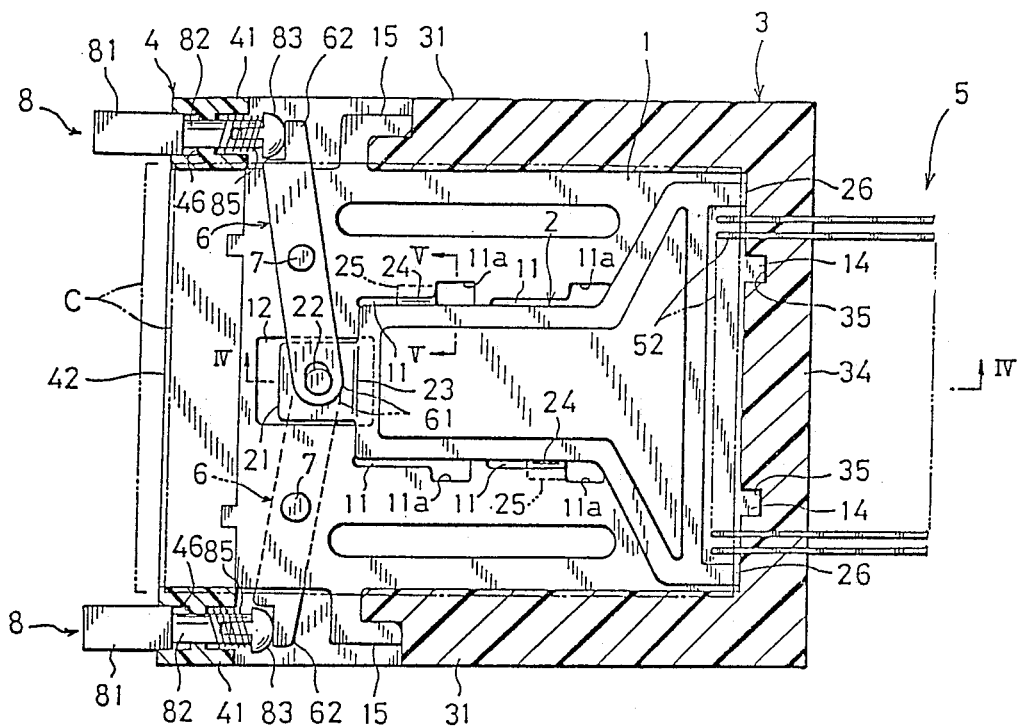
FIG. 2 is a transverse plan view of the card connector in FIG. 1.
Figure 3:
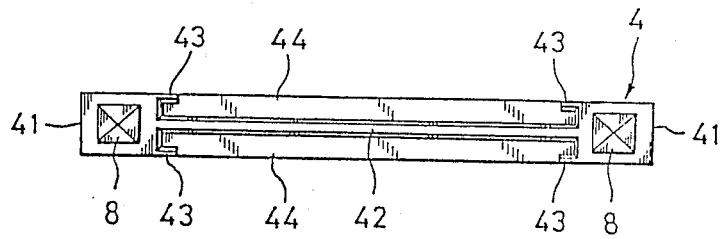
FIG. 3 is a front view of the card connector in FIG. 1.

FIG. 1 to FIG. 3 show a card connector in accordance with each of the first and second embodiments of the present invention. FIG. 4 is an enlarged section view taken along the line IV—IV in FIG. 2, while FIG. 5 is an enlarged section view taken along the line V—V in FIG. 2.

A frame 1 is a substantially rectangular flat plate having great flexural rigidity. The frame 1 is made by punching a metallic plate into a predetermined shape.

Each of metallic sliders 2 is provided at the front end thereof with a projection 21 having a ring-like raised portion 22 as shown in FIG. 4. The projection 21 is provided at the base portion thereof with a step portion 23. Each slider 2 is provided at both lateral sides thereof with engagement pieces 25 through step portions 24.

Each slider 2 has a rear end portion wider than the front end portion thereof. The rear end portion of the slider 2 is provided at both transverse ends thereof with engagement pawls 26 turned at right angles to the slider top surface. The engagement pawls 26 project in a direction opposite to a direction in which the step portions 23, 24 of the projection 21 and the engagement pieces 25 project.

The frame 1 has longitudinally lengthened guide grooves 11 and a longitudinally lengthened housing hole 12. Each slider 2 is attached to the frame 1 in an overlapping manner with the engagement pawls 26 fitted in the guide grooves 11 in the frame 1 and the raised portion 22 fitted in the housing hole 12 in the frame 1. With each slider 2 attached to the frame 1 in such a manner, the slider 22 is longitudinally slidable along the guide grooves 11 with the left- and right-hand engagement paws 26 located in the vicinity of the left- and right-hand ends of the frame 1.

In the connector in FIG. 1, there are formed four guide grooves 11 in which two grooves are formed in two, front and rear, rows. Such provision is made for attaching two sliders 2 to the frame 1 on the upper and lower surfaces thereof, respectively. One slider 2 is disposed on the frame 1 with the engagement pieces 25 thereof fitted in two diagonal guide grooves 11, while the other slider 2 is disposed under the frame 1 with the engagement pieces 25 thereof fitted in the other two diagonal guide grooves 11. This enables sliders 2 identical with each other in shape and dimensional relationship, i.e., one as it is and the other as turned over to be attached to the frame 1 at the upper and lower sides thereof. Accordingly, it is not required to prepare two types of sliders different in shape and dimensional relationship, with one to be attached to the upper side of the frame 1 and with the other to be attached to the lower side thereof. This advantageously reduces the number of component parts.

Each of the guide grooves 11 is provided at one portion in the longitudinal direction thereof with a wider opening 11a. With the use of the openings 11a, the engagement pieces 25 may be fitted into and removed from the guide grooves 11.

For an application in which only one memory card is to be used, one slider 2 is attached to the frame 1 at either the upper or lower side thereof. For an application in which two memory cards C (See FIGS. 2 and 4) are to be used, two sliders 2 are attached to the frame 1 at both the upper and lower sides thereof, respectively, as shown in FIGS. 2 and 4.

A frame member 3 is made substantially in a U-shape in plan view. The frame member 3 has left- and right-hand side frames 31 each of which is provided in the inner surface thereof with a frame holding groove 32 and memory card guide grooves 33 at both upper and lower sides of the frame holding groove 32. The frame 1 is fitted in the frame member 3 with the lateral edges of the frame 1 inserted into the frame holding grooves 32 in the left- and right-hand side frames 31. With the frame 1 fitted in the frame member 3 in such a manner, edge-like fixing pawls 13 of the frame 1 bite the frame holding grooves 32 at predetermined portions thereof. Further, pawl pieces 14 at the rear end of the frame 1 are pressingly inserted into and bite two holes 35 formed in a rear frame 34 of the frame member 3. Further, as shown in FIG. 2, L-shaped engagement portions 15 projecting from the left- and right-hand lateral sides of the frame 1 are fittingly engaged with the side frames 31. Accordingly, the frame 1 and the frame member 3 are securely integrated in a unitary structure, and the frame 1 assures the mechanical strength required for such a connector.

The thickness of the connector considerably depends on the distances between the frame holding grooves 32 and the memory card guide grooves 33. The narrower the distances are, the thinner the connector is. Accordingly, it is advantageous to minimize these distances.

As shown in FIG. 4, the connector shown in FIGS. 1 to 5 is arranged such that the projections 21 of the sliders 2 are fully housed, as overlapping each other, in the housing hole 12 in the frame 1. Accordingly, there is no likelihood that the memory cards C inserted into the memory card guide grooves 33 interfere with the projections 21, even though the memory card guide grooves 33 are formed near the frame holding grooves 32. Thus, the connector shown in FIGS. 1 to 5 may be advantageously made extremely thin without causing the inconvenience that the memory cards C interfere with the projections 21 at the time of insertion and removal of the cards C. In the connector shown in the drawings, two sliders 2 identical with each other in shape and dimensional relation are used with one as it is and the other as turned over. Accordingly, the engagement pieces 25 of one slider 2 do not project with respect to the other slider 2. This prevents the memory cards C from interfering with the sliders 2.

A front frame 4 has left- and right-hand case portions 41 each having a square section, and a flat-plate partition member 42 connecting both case portions 41 to each other. Each of the case portions 41 is provided at the upper and lower ends thereof with inwardly turned projections 43. As shown in FIG. 3, there are formed memory card insertion and removal openings 44 between these projections 43 and the partition member 42. The front frame 4 is a part of the frame member 3. When the front frame 4 abuts on the front end of the frame 1, the case portions 41 are located continuously with the side frames 31 of the frame member 3 with the partition portion 42 being continuously flush with the frame 1, as shown in FIG. 2. The front frame 45 has positioning concaves 45 fitted in projections 16 of the frame 1.

A chain-like lead-pin unit 5 has lead pins 52. The lead pins 52 are collectively pressingly inserted in and held by the rear end of the frame member 3. This causes the lead pins 52 to be integrated in a unitary structure with the frame member 3. Afterwards, a connecting portion 51 of the lead-pin unit 5 is separated from the lead pins 52. Then, the lead pins 52 project on the upper side of the frame 1 and under the lower side thereof, at the rear end thereof.

Each of shafts 6 is swingingly attached, at the intermediate portion thereof, to the frame 1 with a connecting pin 7 serving as a swing fulcrum. Each shaft 6 has one end 61 fitted in the ring-like raised portion 22 formed at the projection 21 of each slider 2. The other end 62 of each shaft 6 has a turned piece 63, which is fitted in one case portion 41 of the front frame 4. Each shaft 6 is disposed for each slider 2. One shaft 6 is disposed on the upper side of the frame 1 in an overlapping manner, while the other shaft 6 is disposed under the lower side of the frame 1 in an overlapping manner.

Each of actuators 8 includes a pressing portion 81, a projection 82 disposed at the pressing portion 81, and an expanded chip 83 at the tip of the projection 82. The chip 83 is longitudinally movably held. The pressing portions 81 are fitted in the case portions 41 of the front frame 4 such that the chips 83 are opposite to the turned pieces 63 of the shafts 6 (See FIG. 2).

Coil springs 85 are compressingly disposed between the chips 83 and step portions 46 of the case portions 41 of the front frame 4, as shown in FIG. 2. The coil springs 85 give a resilient spring load to the other ends 62 of the shafts 6, through the chips 83. Through the shafts 6, the sliders 2 are biased normally in the advancing direction thereof, i.e., in a direction toward the insertion and removal openings 44. The coil springs 85 may be disposed at other portions than those shown in FIG. 2 to bias the sliders 2 normally in the advancing direction. Alternately, other springs than the coil springs may be used for biasing the sliders 2.

In the arrangement above-mentioned, when memory cards C are inserted through the insertion and removal openings 44, the tips of the memory cards C come in contact with the engagement pawls 26 of the sliders 2. Then, the sliders 2 are moved against the spring loads of the coil springs 85. As shown in FIG. 4, the lead pins 52 are inserted into lead-pin insertion holes $C_1$ in the memory cards C. This causes the external contacts of the memory cards C to be conducted, through the lead pins 52, with the external contacts of a device (not shown) on which the connector is mounted. When the memory cards C are inserted to predetermined positions where the ends of the memory cards C at the operator side do not project from the insertion and removal openings 44, the memory cards C are held at the predetermined positions by lock mechanisms (not shown). The lock mechanisms may be disposed between the memory cards C and the device or between the memory cards C and the connector.

When removing the memory cards C, the pressing portions 81 of the actuator 8 may be pushed with the finger of the operator. This causes a pushing force applied to the pressing portions 81 to be transmitted to the shafts 6 through the chips 83. Then, the shafts 6 are swung with the connecting pins 7 serving as fulcrums. By the ends 61 of the shafts 6, the sliders 2 are pulled in the advancing direction. This causes the engagement pawls 26 to push the tip edges of the memory cards C from behind. This forcibly releases the lock states provided by the lock mechanisms. When the lock states by the lock mechanisms are released, the sliders 2 are instantaneously advanced by the spring loads of the coil springs 85. This causes the operator-side ends of the memory cards C pushed by the engagement pawls 26, to jump out from the insertion and removal openings 44 to a position, for example, as shown by virtual lines in FIG. 2. Accordingly, the memory cards C may be pulled out with the hand.

At the time when the actuators 8 are actuated to push the memory cards C from behind by the engagement pawls 26 of the sliders 2 as above-mentioned, an uneven behind-pushing force is not applied to the memory cards C since the memory cards C are engaged, at the left- and right-hand ends of the tip edges thereof, with the engagement pawls 26. Accordingly, the memory cards C may be smoothly pushed from behind without awkward movement, assuring a good maneuverability.

Further, the pushing force applied to the actuators 8 is converted into a tensile force to be applied to the sliders 2, by the leverage action of the shafts 6. Accordingly, it is preferred to select the setting positions of the connecting pins 7 such that the distances between the swing fulcrums of the shafts 6 and the positions of the shafts 6 opposite to the chips 83 (force points) are greater than the distance between the swing fulcrums of the shafts 6 and the ends 61 (operation points) of the shafts 6. In this case, a great tensile force may be provided with a small pushing force. Thus, a proper selection of the setting positions of the connecting pins 7 presents the advantage that the memory cards C may be pulled out from the lead pins 52, with a relatively small pushing force, such removal otherwise requiring a relatively great force.

In the embodiment above-mentioned, the actuators 8 are attached to the connector at the front thereof. However, such mounting positions may be suitably selected with the mounting condition of the connector on the device taken into consideration. For example, when the connector is incorporated in a computer or the like, the removing operation at the front side is preferred. In this case, the actuators 8 may be conveniently disposed at the front of the connector as shown in FIG. 1. However, the connector may be incorporated in a compact device to be handled with one hand. In this case, there are instances where the actuators 8 are conveniently attached to the lateral, upper or lower side of the connector. In this case, the shafts 6 may be changed in shape such that the other ends 62 of the shafts 6 are opposite to the selected lateral, upper or lower side of the connector.

The embodiment above-mentioned presents the advantage that the individual actuators 8 may independently actuate two sliders 2, respectively.

It is apparent that the connector may be arranged such that three or more memory cards are used therewith, in addition to the application where only one memory card or two memory cards are used with the connector as above-mentioned.

Figure 6:
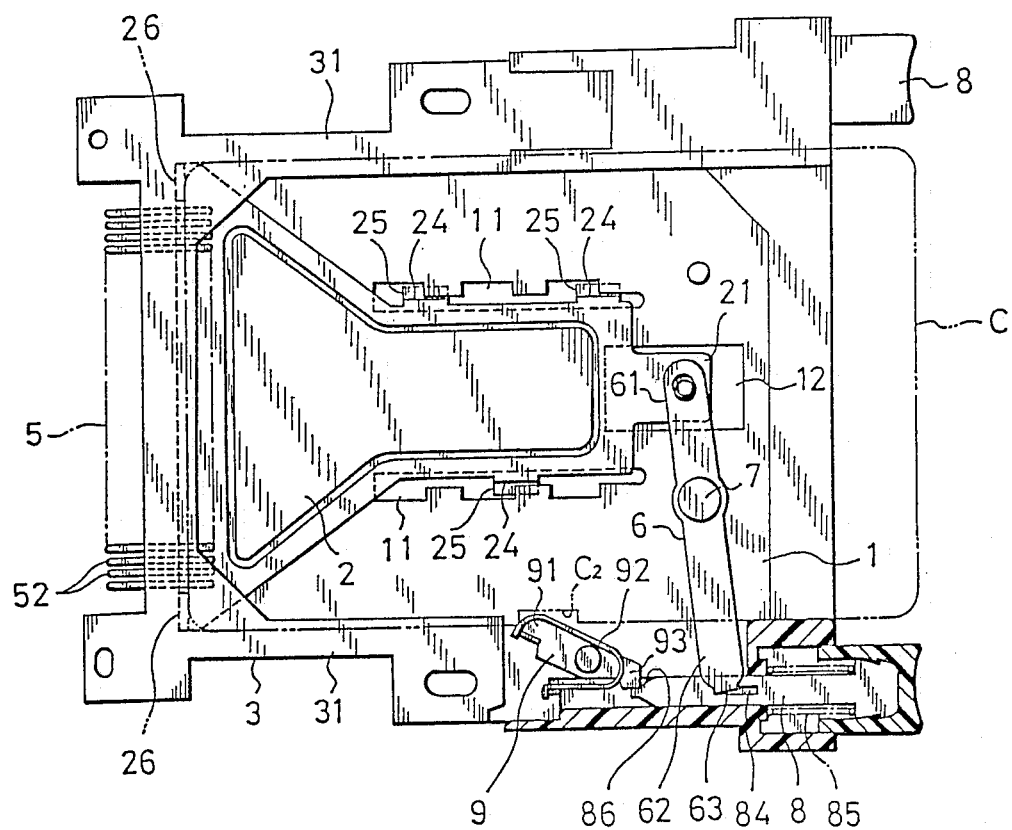
FIG. 6 is a plan view, with portions broken away, of a card connector in accordance with the third embodiment of the present invention.
Figure 7:
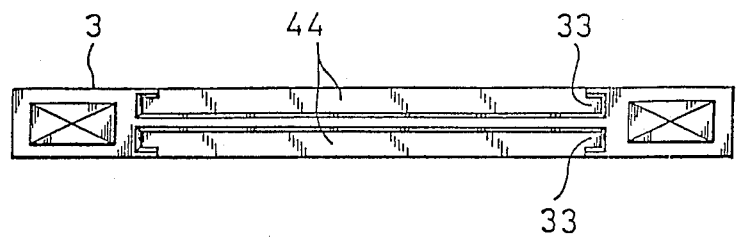
FIG. 7 is a front view of the card connector in FIG. 6.
Figure 8:
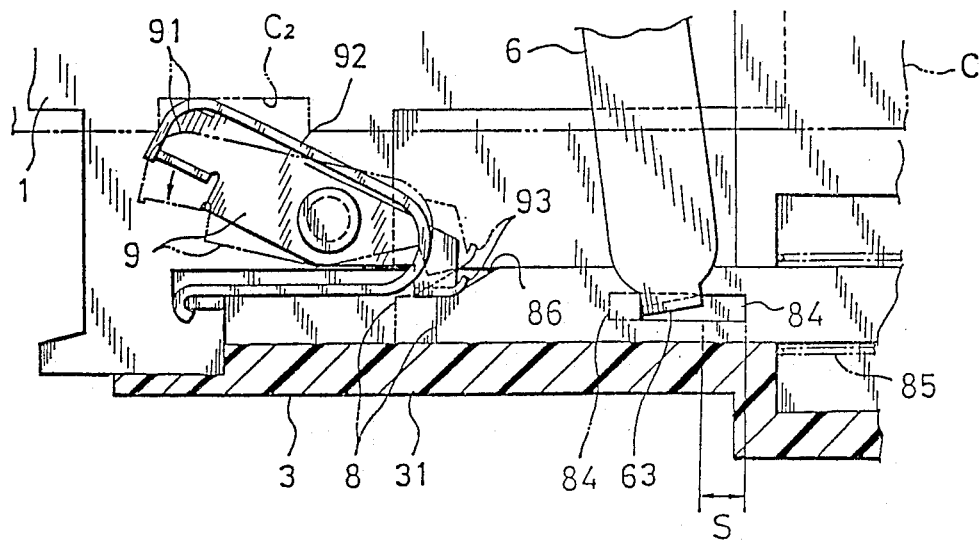
FIG. 8 is an enlarged view of main portions of the card connector in FIG. 6.

FIGS. 6 and 7 show the connector in accordance with the third embodiment of the present invention, while FIG. 8 is an enlarged view of the main portions of the connector in FIG. 6.

A frame 1 is a substantially rectangular flat plate having great flexural rigidity. The frame 1 is made by punching a metallic plate into a predetermined shape.

Each metallic slider 2 is provided at the front end thereof with a hook-like projection 21. Each slider 2 is provided at both lateral sides thereof with engagement pieces 25 through step portions 24. Each slider 2 has a rear end portion wider than the front end portion thereof. The rear end portion of each slider 2 is provided at both transverse ends thereof with standing engagement pawls 26 turned at right angles to the slider top surface. The engagement pawls 26 project in a direction opposite to a direction in which the projection 21 and the step portions 24 of the engagement pieces 25 project.

The frame 1 has longitudinally lengthened guide grooves 11 and a longitudinally lengthened housing hole 12. Each slider 2 is attached to the frame 1 in an overlapping manner with the engagement pieces 25 fitted in the guide grooves 11 in the frame 1 and the projection 21 fitted in the housing hole 12 in the frame 1. When each slider 2 is attached to the frame 1 in such a manner, the slider 2 is longitudinally slidable along the guide grooves 11.

Although not shown, two sliders 2 are attached to the frame 1 at the upper and lower sides thereof, respectively.

For an application in which only one memory card is to be used, one slider 2 may be attached to the frame 1 at the upper or lower side thereof. For an application in which two memory cards C are to be used, two sliders 2 may be attached to the frame 1 at both upper and lower sides thereof, respectively.

A frame member 3 is made substantially in the form of a rectangular case in plan view. The frame member 3 has left- and right-hand side frames 31 each of which is provided in the inner surface thereof with a frame holding groove and memory card guide grooves 33 at both upper and lower sides of the frame holding groove. The frame 1 is fitted in the frame member 3 with the lateral edges of the frame 1 inserted into the frame holding grooves in the left- and right-hand side frames 31. There are formed memory card insertion and removal openings 44 at the front end of the frame member 3. The connector body is constituted by this frame member 3 and the frame 1.

A chain-like lead pin unit 5 has lead pins 52. The lead pins 52 are collectively pressingly inserted in and held by the rear end of the frame member 3. Thus, the lead pins 52 are integrated in a unitary structure with the frame member 3 and project from the rear end of the frame member 3.

Each shaft 6 is swingingly attached, at the intermediate portion thereof, to the frame 1 with a connecting pin 7 serving as a fulcrum. Each shaft 6 has one end 61 swingingly connected to the projection 21 of each slider 2. The other end 62 of each shaft 6 has a turned piece 63, which is fitted in a slot 84 formed in each actuator 8. Each actuator 8 is longitudinally movable and biased normally in the projection direction by a coil spring 85. Accordingly, formed between each shaft 6 and each actuator 8 is a play S corresponding to the distance in length between the slot 84 and the turned piece 63.

The frame 1 has plate-like swing members 9. Each swing member 9 has an engagement portion 91 adapted to be engaged with and disengaged from a concave portion to be engaged $C_2$ of each memory card C. The engagement portions 91 are normally biased toward the portions to be engaged $C_2$ by springs 92. The actuators 8 are provided at the tips thereof with cam surfaces 86 along which the other ends of the swing members 9 are adapted to follow. When the actuators 8 are pushed, the other ends 93 of the swing members 9 are displaced by the cam surfaces 86 such that the engagement portions 91 of the swing members 9 are disengaged from the portions to be engaged $C_2$ of the cards C, while the plays S between the slots 84 and the turned pieces 63 disappear such that the shafts 6 are interlocked with the swing members 9.

With the arrangement above-mentioned, when memory cards C are inserted through the insertion and removal openings 44, the tips of the memory cards C come in contact with the engagement pawls 26 of the sliders 2. Then, the sliders 2 are moved to the retreat positions. The lead pins 52 are then inserted into lead-pin insertion holes in the memory cards C. This causes the external contacts of the memory cards C to be conducted, through the lead pins 52, with the external contacts of a device (not shown) on which the connector is mounted. Thus, the cards C are set and the engagement portions 91 of the swing members 9 are fitted in the portions to be engaged $C_2$ of the cards C. Then, the cards C are locked at these positions.

When unloading the memory cards C, the actuators 8 are pushed against the coil springs 85. At the initial stage when the actuators 8 are pushed, the other ends 93 of the swing members 9 are displaced by the cam surfaces 86. This causes the engagement portions 91 of the swing members 9 to be disengaged from the portions to be engaged C₂ of the cards C. During such disengagement, the plays S disappear. After the plays S have disappeared, the shafts 6 are rotated as interlocked with the actuators 8. This causes the sliders 1 to advance such that the cards C are unloaded.

The embodiment above-mentioned is arranged such that two different actuators 8 may independently actuate two sliders 2, respectively.

What is claimed is:

1. A card connector comprising:
   a metallic plate-like frame having an upper side and a lower side;
   a frame member having a front end, a rear end, and provided at the front end thereof with a card insertion and removal opening;
   a connector body disposed at the rear end of said frame member;
   a slider longitudinally slidably attached to said frame;
   a spring for biasing said slider normally in the advancing direction thereof;
   a shaft swingingly attached to said frame; and an actuator;
   said frame being fitted in said frame member;
   said frame member having card guide grooves;
   said slider having at least one engagement pawl adapted to be opposite to the tip of a card when the card is inserted into said card guide grooves; and
   said shaft having one end swingingly connected to said slider and the other end opposite to said actuator.

2. A card connector as set forth in claim 1, wherein two shafts and two actuators are provided, the slider having the engagement pawls is attached to the frame at each of the upper and lower sides thereof, and the two shafts and two actuators are disposed such that one end of each shaft is swingingly connected to each slider and the other end of each shaft is opposite to each actuator.

3. In a card connector having a slider including at least one engagement pawl, and a connector body which houses, in a longitudinally movable manner, said slider, in which, when a card is inserted into said connector body, said slider is adapted moved to a retreat position with the tip of the card engaged with said engagement pawl, such that the card is held at a setting position,
   said card connector comprising, in addition to said connector body and said slider:
   a longitudinally movable actuator;
   a shaft swingingly attached to said connector body and having one end swingingly connected to said slider and the other end connected to said longitudinally movable actuator, projecting from the front end of said connector body;
   a swing member disposed on said connector body and provided at one end thereof with an engagement portion adapted to be engaged with and disengaged from a portion of the card held at said setting position to be engaged; and
   a cam surface formed at the tip of said actuator, which along with the other end of said swing member, is adapted to follow
   whereby play is formed between said actuator and the other end of said shaft, and when said actuator is pushed, said other end of said swing member is adapted to be displaced by said cam surface such that said engagement portion of said swing member is disengaged from said portion of the card to be engaged, while the play is removed and said shaft is interlocked with said actuator.

* * * * *

UNITED STATES PATENT AND TRADEMARK OFFICE
CERTIFICATE OF CORRECTION

PATENT NO. : 4,952,161

DATED : August 28, 1990

INVENTOR(S) : Yasuhiro Komatsu

It is certified that error appears in the above-identified patent and that said Letters Patent is hereby corrected as shown below:

Claim 3, column 10, line 7, between "adapted" and "moved" insert "to be".

Signed and Sealed this

Third Day of March, 1992

Attest:

HARRY F. MANBECK, JR.

*Attesting Officer*  *Commissioner of Patents and Trademarks*